(12) United States Patent
Herzog et al.

(10) Patent No.: US 9,290,641 B2
(45) Date of Patent: *Mar. 22, 2016

(54) COMPOSITE MATERIAL COMPRISING POLYETHYLENE AND MAGNETIC PARTICLES

(75) Inventors: Harald Herzog, Karlstein (DE); Konrad Rockstein, Engelskirchen (DE); Stipan Katusic, Bad Soden (DE); Aristidis Ioannidis, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 239 days.

This patent is subject to a terminal disclaimer.

(21) Appl. No.: 13/376,674

(22) PCT Filed: May 25, 2010

(86) PCT No.: PCT/EP2010/057113
§ 371 (c)(1),
(2), (4) Date: Dec. 7, 2011

(87) PCT Pub. No.: WO2010/149443
PCT Pub. Date: Dec. 29, 2010

(65) Prior Publication Data
US 2012/0080637 A1 Apr. 5, 2012

(30) Foreign Application Priority Data
Jun. 23, 2009 (DE) .......................... 10 2009 027 090

(51) Int. Cl.
C08K 9/00 (2006.01)
C08K 9/02 (2006.01)

(52) U.S. Cl.
CPC ........................ *C08K 9/02* (2013.01)

(58) Field of Classification Search
CPC .............................. C08L 23/00; C08K 3/0016
USPC ........................................ 252/62.54; 977/779
See application file for complete search history.

(56) References Cited

U.S. PATENT DOCUMENTS

| | | | | |
|---|---|---|---|---|
| 4,035,322 A * | 7/1977 | Tate et al. | ......................... | 524/87 |
| 4,492,734 A * | 1/1985 | Ogawa et al. | .............. | 428/424.2 |
| 4,626,371 A * | 12/1986 | Ikenaga et al. | .............. | 252/62.54 |
| 5,053,446 A * | 10/1991 | Salyer | ................................ | 524/8 |
| 6,528,585 B1 | 3/2003 | Standke et al. | | |
| 6,864,323 B2 | 3/2005 | Schlosser et al. | | |
| 6,946,537 B2 | 9/2005 | Krafczyk et al. | | |
| 7,534,829 B2 * | 5/2009 | Tai et al. | ........................ | 524/503 |
| 7,781,520 B2 | 8/2010 | Standke et al. | | |
| 2002/0039869 A1 * | 4/2002 | Achille | ......................... | 442/417 |
| 2002/0164502 A1 * | 11/2002 | Hayashi et al. | ......... | 428/694 BA |
| 2003/0018155 A1 | 1/2003 | Krafczyk et al. | | |
| 2004/0144960 A1 * | 7/2004 | Arai et al. | ...................... | 252/500 |
| 2005/0106098 A1 * | 5/2005 | Tsang et al. | .................. | 424/1.11 |
| 2006/0105170 A1 * | 5/2006 | Dobson et al. | ................. | 428/403 |
| 2008/0027161 A1 | 1/2008 | Schlosser et al. | | |
| 2008/0044680 A1 * | 2/2008 | Thibodeau et al. | ............ | 428/547 |
| 2008/0114134 A1 * | 5/2008 | Pohl | ............................... | 525/474 |
| 2008/0129462 A1 * | 6/2008 | Vignola et al. | ............... | 340/10.1 |
| 2008/0187673 A1 | 8/2008 | Standke et al. | | |
| 2009/0155551 A1 | 6/2009 | Zimmer et al. | | |
| 2009/0186053 A1 | 7/2009 | Meyer et al. | | |
| 2011/0006247 A1 * | 1/2011 | Katusic et al. | .............. | 252/62.59 |
| 2011/0144277 A1 | 6/2011 | Weissenbach et al. | | |
| 2011/0144278 A1 | 6/2011 | Weissenbach et al. | | |
| 2011/0147641 A1 | 6/2011 | Meyer et al. | | |
| 2011/0207869 A1 | 8/2011 | Katusic et al. | | |
| 2011/0282024 A1 | 11/2011 | Weissenbach et al. | | |
| 2012/0065302 A1 | 3/2012 | Weissenbach et al. | | |
| 2012/0130023 A1 | 5/2012 | Herzog et al. | | |
| 2013/0303658 A1 | 11/2013 | Katusic et al. | | |

FOREIGN PATENT DOCUMENTS

| | | | | |
|---|---|---|---|---|
| CN | 1523076 A | 8/2004 | | |
| CN | 1914284 A | 2/2007 | | |
| EP | 2 070 677 | 6/2009 | | |
| WO | 00 74541 | 12/2000 | | |
| WO | WO03072653 | * 9/2003 | .............. | C08L 29/04 |

OTHER PUBLICATIONS

U.S. Appl. No. 13/580,385, filed Aug. 22, 2012, Weissenbach, et al.
Search Report issued Apr. 28, 2013 in Chinese Application No. 201080028450.1 (English Translation).

* cited by examiner

*Primary Examiner* — Hannah Pak
(74) *Attorney, Agent, or Firm* — Oblon, McClelland, Maier & Neustadt, L.L.P.

(57) ABSTRACT

Provided is a composite material which is in pellet form and which has particles with a core-shell structure, where the core of the particles has one or more magnetic materials, and the shell is made of silicon dioxide, and the pellet has one or more crosslinkable polyethylene and/or polyethylene-containing copolymers. Also provided is a process for crosslinking polyethylenes, by mixing the composite material, one or more free radical initiators, and at least one polyethylene, and heating the mixture inductively.

19 Claims, No Drawings

COMPOSITE MATERIAL COMPRISING POLYETHYLENE AND MAGNETIC PARTICLES

CROSS REFERENCE TO RELATED APPLICATIONS

The present application is the national stage of international application PCT/EP2010/057113, filed on May 25, 2010, and claims the benefit of the filing date of German Application No. 10-2009-027090.6, filed on Jun. 23, 2009.

The invention relates to a composite material which comprises magnetic particles and which comprises a crosslinkable polyethylene. The invention further relates to a process for the crosslinking of polyethylene by using the said composite material.

The use of heat-activatable free-radical initiators is familiar practice for the crosslinking of polyethylenes. The crosslinking process takes place thermally, a disadvantage of this being the necessity to heat the entire composition that is to be crosslinked. The methods for this generally use industrial ovens or salt baths, the result being uneconomic energy input. Furthermore, because polymers have poor thermal conductivity, the external regions of the entire composition to be crosslinked are subjected to greater thermal stress than the internal regions, with a possible adverse effect on the properties of these.

Organic peroxides are the most important heat-activatable free-radical initiators. Particularly if metals are present, these peroxides are often highly unstable and decompose rapidly, without bringing about sufficient crosslinking.

It is known from adhesive technology that the polymers commonly used in that field can be hardened by inductive methods. To this end, superparamagnetic particles are introduced into a binder matrix. The hardening then takes place in the presence of a magnetic field. The superparamagnetic particles specified for this application generally lead to rapid decomposition of peroxides, the result being that hardening via heat-activatable free-radical initiators does not yield the desired successful result.

It was an object of the present invention to provide a material which is suitable for bringing about polyethylene crosslinking initiated by heat-activatable free-radical initiators. The intention here is in particular to provide an efficient way of crosslinking polyethylene, particularly in the context of pipes for the supply of water and of gas.

The invention provides a composite material in pellet form comprising
particles with a core-shell structure, where the core of the particles comprises one or more magnetic materials and the shell comprises silicon dioxide and
a polyethylene crosslinkable in the presence of a heat-activatable free-radical initiator and/or polyethylene-containing copolymers.

For the purposes of the invention, composite material is a physical mixture of the components in the form of pellets. The distribution of the components here is very substantially homogeneous.

A feature of the composite material of the invention is that no undesired decomposition of the heat-activatable initiator generally takes place in subsequent use. The pellet form moreover permits easy handling.

For the purposes of the invention, heat-activatable means that free radicals are formed thermally. The temperatures during the crosslinking of polymers are generally about 50° C. to 250° C. as a function of the free-radical initiator and of the polymer to be crosslinked. Examples of heat-activatable free-radical initiators for the purposes of the invention are organic peroxides and initiators having labile carbon-carbon bonds. Examples of these two groups are specified at a later stage in the description.

For the purposes of the invention, particles with a core-shell structure are particles which
are isolated individual particles surrounded by a shell,
are aggregates of accreted cores, where the aggregates have been surrounded by a shell and/or
are aggregates accreted by way of the shells.

Aggregates are individual particles firmly accreted, for example by way of sinter necks.

The proportion of polyethylene in the composite material of the invention is preferably from 30 to 99.9% by weight. A particularly preferred proportion is from 75 to 99% by weight.

The proportion of particles with core-shell structure is preferably from 0.1 to 70% by weight. A particularly preferred proportion is from 1 to 25% by weight.

The shell of the particles which have core-shell structure and which are present in the composite material according to the invention can be one or more shells surrounding the core, where at least one of these shells comprises silicon dioxide or is composed to a very substantial extent thereof. If the particles having core-shell structure have a plurality of shells, it is advantageous that the exterior shell is a perforation-free shell made of silicon dioxide completely enclosing the core.

Shells located relatively close to the core do not have to be completely perforation-free. These can by way of example comprise compounds composed of the elements involved in the shell material and the elements involved in the core material. By way of example, this can be iron silicate if the core comprises iron or iron compounds.

The expression composed very substantially thereof means that in this type of instance the shell can also comprise typical contaminants. The amount of these is generally less than 1% by weight, preferably less than 0.1% by weight and particularly preferably less than 0.01% by weight, based in each case on the shell. The silicon dioxide of the shell is mainly or exclusively amorphous silicon dioxide.

The thickness of the shell is preferably in the nanometre range. A particularly preferred thickness can be from 2 to 500 nm, and a very particularly preferred thickness can be from 5 to 30 nm.

The shell is preferably substantially pore-free and has free hydroxy groups on the surface.

Magnetic materials according to the invention are paramagnetic, ferromagnetic, ferrimagnetic, or superparamagnetic materials, or a mixture of these. Preference can be given to superparamagnetic materials and materials which have only slight remanant magnetization.

Preference can be given to particles which have a core-shell structure and which exhibit not only superparamagnetic properties (Neel relaxation) but also hysteresis. These properties are dependent by way of example on chemical constitution, on particle size distribution, on the shape of the particles, and on the magnetizability thereof.

Suitable core materials can by way of example be pure metals, such as Fe, Co and Ni, oxides such as $Fe_3O_4$ and gamma-$Fe_2O_3$, spinel-type ferromagnetic materials such as $MgFe_2O_4$, $MnFe_2O_4$ and $CoFe_2O_4$, and also alloys such as $CoPt_3$ and FePt.

In one particular embodiment of the invention, the core material comprises or consists of one or more iron oxides selected from the group consisting of haematite, magnetite and maghemite, or a mixture of two or three of these iron oxides. Particularly advantageous properties for inductive heating of the composite material according to the invention are obtained with a core material which comprises haematite, magnetite and maghemite, where X-ray diffraction diagrams determine the proportion of haematite as from 1 to 10% by weight, the proportion of magnetite as from 20 to 50% by weight and the proportion of maghemite as from 40 to 75% by weight, in each case based on the core, and the intention is that these proportions give a total of 100% by weight. In one preferred embodiment of the invention, the proportion of haematite is from 4 to 8% by weight, that of magnetite is from 35 to 40% by weight and that of maghemite is from 50 to 60% by weight.

The proportions of core material and of shell material can vary within wide limits as a function of core material, of the thickness of the shell, and of the structure of the particles, isolated or aggregated. The proportions of the core material and of the shell material are generally in each case from 10 to 90% by weight. Preference can be given to core-shell particles with a high proportion of from 50 to 90% by weight of core material and from 10 to 50% by weight of shell material.

The BET surface area of the core-shell particles can be from 5 to 500 m$^2$/g, preferably from 30 to 300 m$^2$/g and very particularly preferably from 40 to 150 m$^2$/g. The average diameter of the particles is preferably from 5 to 100 nm and particularly preferably from 30 to 80 nm. The 90% spread of the proportional distribution of the particles according to the invention is preferably from 5 to 60 nm.

In one particular embodiment of the invention, the particles having core-shell structure can be present in surface-modified form. For the purposes of the invention, surface-modified means that at least a portion of the hydroxy groups located on the surface of the powder have reacted with a surface modifier to form a chemical bond. The chemical bond is preferably a covalent bond, ionic bond or coordinative bond with formation of a complex between the surface modifier and the particle. A coordinative bond means formation of a complex.

The surface modifier can preferably be surface modifiers which have, as functional group, a carboxylic acid group, an acyl chloride group, an ester group, a nitrile group, an isonitrile group, a hydroxy group, a thiol group, an epoxy group, an anhydride group, an amide group, an amino group, or a silanol group.

Particularly preferred surface modifiers are silanes which have at least one non-hydrolysable group or one hydroxy group, in particular hydrolysable organosilanes which also have at least one non-hydrolysable moiety.

Examples are silanes of the general formula $R_aSiX_{4-a}$, in which the moieties R are identical or different and are non-hydrolysable groups, the moieties X are identical or different and are hydrolysable groups or hydroxy groups, and a is the value 1, 2 or 3. The value of a is preferably 1. Examples of the hydrolysable groups X in the general formula, where these can be identical or differ from one another, are hydrogen or halogen, F, Cl, Br or I;
alkoxy, in particular $C_1$-$C_6$-alkoxy, such as methoxy, ethoxy, n-propoxy, isopropoxy and butoxy;
aryloxy, in particular $C_6$-$C_{10}$-aryloxy, such as phenoxy;
acyloxy, in particular $C_1$-$C_6$-acyloxy, such as acetoxy or propionyloxy;
alkylcarbonyl, in particular $C_2$-$C_7$-alkylcarbonyl, such as acetyl;
amino, in particular monoalkylamino or dialkylamino, preferably having in each case from 1 to 6 carbon atoms.

Preferred hydrolysable moieties are halogen, alkoxy groups and acyloxy groups. Particularly preferred hydrolysable moieties are $C_1$-$C_4$-alkoxy groups, in particular methoxy and ethoxy.

The non-hydrolysable moieties R which can be identical or differ from one another can be non-hydrolysable moieties R having or not having a functional group. By way of example, the non-hydrolysable moiety R not having a functional group can be alkyl, in particular $C_1$-$C_8$-alkyl, such as methyl, ethyl, n-propyl, isopropyl, n-butyl, sec-butyl and tert-butyl, pentyl, hexyl, octyl or cyclohexyl;
alkenyl, in particular $C_2$-$C_6$-alkenyl, such as vinyl, 1-propenyl, 2-propenyl and butenyl;
alkynyl, in particular $C_2$-$C_6$-alkynyl, such as acetylenyl and propargyl;
aryl, in particular $C_6$-$C_{10}$-aryl, such as phenyl and naphthyl, and also corresponding alkaryl moieties, such as tolyl, benzyl and phenethyl.

Explicit mention may be made of the following surface modifiers: $CH_3SiCl_3$, $CH_3Si(OC_2H_5)_3$, $CH_3Si(OCH_3)_3$, $C_2H_5SiCl_3$, $C_2H_5Si(OC_2H_5)_3$, $C_2H_5Si(OCH_3)_3$, $C_3H_7Si(OC_2H_5)_3$, $(C_2H_5O)_3SiC_3H_6Cl$, $(CH_3)_2SiCl_2$, $(CH_3)_2Si(OC_2H_5)_2$, $(CH_3)_2Si(OH)_2$, $C_6H_5Si(OCH_3)_3$, $C_6H_5Si(OC_2H_5)_3$, $C_6H_5CH_2CH_2Si(OCH_3)_3$, $(C_6H_5)_2SiCl_2$, $(C_6H_5)_2Si(OC_2H_5)_2$, (iso-$C_3H_7)_3SiOH$, $CH_2$=$CHSi(OOCCH_3)_3$, $CH_2$=$CHSiCl_3$, $CH_2$=$CH$—$Si(OC_2H_5)_3$, $CH_2$=$CHSi(OC_2H_5)_3$, $CH_2$=$CH$—$Si(OC_2H_4OCH_3)_3$, $CH_2$=$CH$—$CH_2$—$Si(OC_2H_5)_3$, $CH_2$=$CH$—$CH_2$—$Si(OC_2H_5)_3$, $CH_2$=$CH_2$—$Si(OOOC_2H_3)_3$, n-$C_6H_{13}$—$CH_2$-$CH_2$—$Si(OC_2H_5)_3$, n-$C_8H_{17}$—$CH_2CH_2$—$Si(OC_2H_5)_3$, γ-glycidyloxypropyltrimethoxysilane, γ-glycidyloxypropyltriethoxysilane, 3-isocyanatopropyl-triethoxysilane, 3-isocyanatopropyldimethylchlorosilane, 3-aminopropyltrimethoxysilane, 3-aminopropyltriethoxy-silane, N-(2-aminoethyl)-3-aminopropyltrimethoxysilane, N-[N'-(2'-aminoethyl)-2-aminoethyl]-3-aminopropyltrimethoxysilane, hydroxymethyltriethoxysilane, 2-[methoxy(polyethyleneoxy)propyl]trimethoxysilane, bis(hydroxyethyl)-3-aminopropyltriethoxysilane, N-hydroxyethyl-N-methylaminopropyltriethoxysilane, 3-(meth)acryloxypropyltriethoxysilane and 3-(meth)acryloxypropyltrimethoxysilane.

Surface modifiers that can be used with particular preference are octyltrimethoxysilane, octyltriethoxysilane, hexamethyldisilazane, 3-methacryloxypropyltrimethoxysilane, 3-methacryloxypropyltriethoxysilane, dimethylpolysiloxane, glycidyloxypropyltrimethoxysilane, glycidyloxypropyltriethoxysilane, nonafluorohexyltrimethoxysilane, tridecaflourooctyltrimethoxysilane, tridecaflourooctyltriethoxysilane, aminopropyltriethoxysilane, and oligomeric, short-chain, alkyl-functionalized silanes. The following can be very particularly preferred: octyltrimethoxysilane, octyltriethoxysilane, dimethylpoly-siloxanes and oligomeric, short-chain, alkyl-functionalized silanes.

The effect of the surface modification is that the particles with core-shell structure have a carbon content which is generally from 0.1 to 10% by weight, as a function of the nature of the surface-modifying reagent and the amount thereof. The content is preferably from 1 to 6% by weight. Surface-modified particles have particularly good suitability for producing the composite material of the invention.

The polyethylene that is a constituent of the composite material of the invention can preferably have been selected from the group consisting of high-density polyethylenes (HDPE), low-density polyethylenes (LDPE), linear low-density polyethylenes (LLDPE), very low-density polyethylenes (VLDPE) and/or polyethylene copolymers, where the polyethylene copolymers always comprise a proportion of from 10 to 30% by weight of copolymer.

Suitable polyethylene copolymers are especially those in which the copolymer is selected from the group consisting of ethylene-vinyl acetate (EVA), ethylene-butyl acrylate (EBA), ethylene-ethyl acrylate (EEA) and/or ethylene-methyl acrylate (EMA).

The invention also provides a process for the crosslinking of polyethylenes, by mixing the composite material of the invention, one or more heat-activatable free-radical initiators and at least one polyethylene, for example in an extruder, and heating the mixture inductively. Suitable types of polyethylene are those specified above.

Inductive heating here means that composite material, heat-activatable free-radical initiators and polyethylene are exposed to an alternating magnetic or electromagnetic field. Familiar inductors in the medium-frequency range of 100 Hz to 100 kHz or in the high-frequency range of from 10 kHz to 60 MHz are suitable for this purpose. The composite material of the invention permits efficient introduction of the energy here. The shell of the core-shell particles used here inhibits premature decomposition of the free-radical initiators, without increasing the difficulty of introducing energy.

The heat-activatable free-radical initiators used in the process of the invention are preferably selected from the group consisting of organic peroxides and initiators having labile carbon-carbon bonds.

The organic peroxides are preferably selected from the group consisting of hydroperoxides, dialkyl peroxides, diaryl peroxides, peroxycarboxylic acids, peroxycarboxylic esters, diacyl peroxides, peroxycarbonate esters, peroxydicarbonates, ketone peroxides, perketals and/or mixtures of these. Individual mention may be made of:

hydroperoxides ($R_1$—O—O—H), such as tert-butyl hydroperoxide, cumyl hydroperoxide, 2,5-dimethyl-2,5-dihydroperoxyhexane;

dialkyl (and/or -aryl)peroxides ($R_1$—O—O—$R_2$), such as di-tert-butyl peroxide, 2,5-dimethylhexyne(3)-2,5-di-tert-butyl peroxide, di(2-tert-butylperoxyisopropyl)benzene, tert-butyl cumyl peroxide, dicumyl peroxide;

peroxycarboxylic acids ($R_1$—C(O)—O—OH), such as peracetic acid, performic acid;

peroxycarboxylic esters ($R_1$—C(O)—O—O—$R_2$), such as tert-butyl peroxypivalate, tert-butyl 2-ethylperoxyhexanoate, mono-tert-butyl peroxymaleate, bis(2-neodecanoylperoxyisopropyl)benzene;

diacyl peroxides ($R_1$—C(O)—O—O—C—(O)$R_2$), such as dibenzoyl peroxide, di(3,5,5-trimethylhexanoyl) peroxide, 2,4-dichlorobenzoyl peroxide;

peroxycarbonate esters ($R_1$—O—C(O)—O—O—$R_2$), such as tert-butylperoxy isopropyl carbonate, tert-butylperoxy 2-ethylhexyl carbonate;

peroxydicarbonates ($R_1$—O—C(O—O—O—C(O)—O—$R_2$), such as di(4-tert-butylcyclohexyl) peroxydicarbonate, di(2-ethylhexyl) peroxydicarbonate, dicetyl peroxydicarbonate;

ketone peroxides, such as cyclohexanone peroxide, methyl isobutyl ketone peroxide, methyl ethyl ketone peroxide, 3,3,5,7,7-pentamethyl-1,2,4-trioxepane, 3,6,9-triethyl-3,6,9-trimethyl-1,2,4,5,7,8-hexoxacyclononane;

perketals: 2,2-bis(tert-butylperoxy)butane, 1,1-di-tert-butylperoxy-3,3,5-trimethylcyclohexane, 1,1-bis(tert-butylperoxy)cyclohexane, 3,3,6,6,9,9-hexamethyl-1,2,4,5-tetraoxacyclononane, ethyl 3,3-di(tert-butylperoxy)butyrate;

other peroxide compounds, such as 3-tert-butylperoxy-3-phenylphthalide, tert-butylperoxyvalerolactone.

From the point of view of industrial availability, particular mention may be made of 1,1,3,3-tetramethylbutyl peroxyneodecanoate, 1,1-di(tert-butylperoxy)-3,3,5-trimethylcyclohexane, 1,1-di(tert-butylperoxy)cyclohexane, 2,2-di(tert-butylperoxy)butane, 2,5-dimethyl-2,5-di(tert-butylperoxy)hexane, 2,5-dimethyl-2,5-di(tert-butylperoxy)hex-3-yne, acetylacetone peroxide, cumyl peroxyneodecanoate, cyclohexanone peroxide, di(2,4-dichlorobenzoyl) peroxide, di(2-ethylhexyl) peroxydicarbonate, di(3,5,5-trimethylhexanoyl) peroxide, di(4-methylbenzoyl) peroxide, di(4-tert-butylcyclohexyl) peroxydicarbonate, di(tert-amyl) peroxide, di(tert-butyl) peroxide, dibenzoyl peroxide, dicetyl peroxydicarbonate, dicumyl peroxide, dilauroyl peroxide, dimyristyl peroxydicarbonate, disuccinoyl peroxide, methyl ethyl ketone peroxide, methyl isobutyl ketone peroxide, tert-amyl 2-ethylperoxyhexanoate, tert-amyl peroxy-2-ethylhexylcarbonate, tert-amyl peroxybenzoate, tert-amyl peroxyneodecanoate, tert-amyl peroxypivalate, tert-butyl cumyl peroxide, tert-butyl hydroperoxide, tert-butyl 2-ethylperoxyhexanoate, tert-butyl peroxy-2-ethylhexylcarbonate, tert-butyl 3,5,5-trimethylperoxyhexanoate, tert-butyl peroxyacetate, tert-butyl peroxybenzoate, tert-butyl peroxyisobutyrate, tert-butyl peroxyneodecanoate, tert-butyl peroxyneoheptanoate and tert-butyl peroxypivalate.

Instead of the organic peroxide or together therewith, the composite material according to the invention can comprise initiators having labile carbon-carbon bonds (C—C initiators), selected from the group consisting of compounds having the general formula Ph-$R^4R^3$C—C$R^5R^6$-Ph, where Ph is a phenyl group or a substituted phenyl group and each of $R^3$, $R^4$, $R^5$ and $R^6$, independently of the others, is hydrogen or an alkyl group. Typical examples are 3,4-dimethyl-3,4-diphenylhexane, 2,3-dimethyl-2,3-diphenylbutane, 3,4-dimethyl-3,4-diphenylhexane, 2,3-dimethyl-2,3-diphenylbutane. Other compounds that can be used as C—C initiators are oligomeric benzopinacole silyl ethers, benzopinacole disilyl ethers, these being monomeric or oligomeric, benzopinacole dimethyl ethers, tetraphenylethane and tetraphenylethane dinitrile.

The process for the invention can also use one or more substances that increase the degree of crosslinking. By way of example, these can be polyfunctional acrylates and methacrylates, N,N-m-phenylenedimaleimide, 2,4,6-triallyloxy-1,3,5-triazine and/or 1,3,5-triallyl isocyanurate.

The invention further provides the use of the composite material of the invention in the production of pipelines for gas and water.

EXAMPLES

Core-Shell Particles:

Example 1

One stream consists of a mixture in the form of vapour made of 0.49 kg/h of $SiCl_4$ and 0.05 kg/h of monosilane and a second stream in the form of an aerosol which is obtained at room temperature (23° C.) by means of a two-fluid nozzle, consists of a 25 percent strength by weight solution of iron(II) chloride, corresponding to 1.55 kg/h of iron(II) chloride, in water, and 5 $Nm^3$/h of nitrogen as spraying gas, and these streams are introduced separately into the mixing zone of a reactor.

This mixture is reacted in the combustion zone of the reactor in a flame generated by igniting a mixture of 7.9 Nm/h of hydrogen and 21 Nm/h of air. The residence time of the reaction mixture in the combustion zone is about 40 ms.

In the cooling zone that follows the combustion zone, the reaction mixture is cooled to 332° C. by introducing 8 kg/h of water.

The resultant solid is separated from the gaseous substances on a filter.

The BET surface area of the resultant solid is 40 $m^2$/g, the average particle diameter is 11 nm, the 90% spread of proportional distribution is from 5 to 20 nm, and the thickness of the shell is from 2 to 15 nm. The proportion of silicon dioxide is 17.4% by weight and the proportion of core constituents is 82.6% by weight. The ratio by weight here of the core constituents maghemite, magnetite and haematite is 57:38:5. The crystallite sizes of maghemite, magnetite and haematite are 325, 525 and 870 Å, and the variation here in the magnetite and haematite values can be ±5% while that in the maghemite values can be ±10%.

Example 2

600 g of the particles from Example 1 are used as initial charge in a mixer, and 12 g of Dynasylan® 9896, Evonik Degussa, are added dropwise. The mixture is then dried for a period of 3.5 hours at a temperature of 120° C.

The Dynasylan® 9896 used is an oligomeric, short-chain, alkyl-functionalized silane. It has a pH of from 3 to 4, density (20° C.) of 1.04 g/cm³, dynamic viscosity (20° C.) of <60 mPas and flashpoint >63° C.

Composite Materials

Example 3-1

1.66 g of the particles from Example 1 and 163.90 g of Lupolen 5261 ZQ 456 are extruded by way of a contrarotating twin-screw extruder with intensively mixing screws (Haake CTW 100) using a temperature profile of 170-170-170° C. and head 220° C., and then pelletized.

Lupolen® 5261 ZQ 456, LyondellBasell, is a high-density polyethylene (HDPE) with density 0.954 g/cm³, melt flow rate (MFR) 3.0 g/10 min (190° C./21.6 kg), tensile modulus 1200 MPa (23° C.), yield stress 27 MPa (23° C.), tensile strain at yield 9% (23° C.), melting point 134° C. and Shore hardness 65 (Shore D (3 sec)).

Examples 3-2 to 3-5 are analogous to Example 3-1, but with different proportions of particles.

Examples 4-1 to 4-5 are analogous to Example 3-1, but use the particles from Example 2 and different contents thereof.

Table 1 gives the starting materials and amounts of Examples 3 and 4. Table 2 shows physicochemical data for the composite materials produced.

TABLE 1

Starting materials and amounts of these

| Example | Particles from Example | Amount g | Poly-ethylene*⁾ g | Total g | Content of particles % by wt. | Content of polyethylene % by wt. |
|---|---|---|---|---|---|---|
| 3-1 | 1 | 1.66 | 163.90 | 165.56 | 1.0 | 99.0 |
| 3-2 | 1 | 5.05 | 163.20 | 168.25 | 3.0 | 97.0 |
| 3-3 | 1 | 10.35 | 162.90 | 173.25 | 6.0 | 94.0 |
| 3-4 | 1 | 17.83 | 160.50 | 178.33 | 10.0 | 90.0 |
| 3-5 | 1 | 27.94 | 158.35 | 186.29 | 15.0 | 85.0 |
| 4-1 | 2 | 1.66 | 163.90 | 165.56 | 1.0 | 99.0 |
| 4-2 | 2 | 5.05 | 163.20 | 168.25 | 3.0 | 97.0 |
| 4-3 | 2 | 10.35 | 162.90 | 173.25 | 6.0 | 94.0 |
| 4-4 | 2 | 17.83 | 160.50 | 178.33 | 10.0 | 90.0 |
| 4-5 | 2 | 27.94 | 158.35 | 186.29 | 15.0 | 85.0 |

*⁾Lupolen 5261 ZQ 456

TABLE 2

Physicochemical data for the composite materials

| Example | Melting point | Maximum temp. | Torque$^{a)}$ Nm | Max torque Nm | Integral torque Nm*min | MFI$^{b)}$ | Grade$^{c)}$ |
|---|---|---|---|---|---|---|---|
| 3-1 | 180.1 | 194.2 | 75.6 | 144.4 | 984.2 | 3.9 | 2.50 |
| 3-2 | 180.6 | 181.2 | 43.9 | 112.0 | 585.7 | 15.6 | 2.50 |
| 3-3 | 177.9 | 179.7 | 42.2 | 95.0 | 680.1 | 6.9 | 2.50 |
| 3-4 | 180.2 | 180.9 | 50.5 | 103.8 | 693.9 | 6.2 | 3.25 |
| 3-5 | 181.4 | 182.1 | 48.5 | 159.5 | 746.8 | 7.5 | 4.00 |
| 4-1 | 184.0 | 185.3 | 54.8 | 136.8 | 704.4 | 7.7 | 2.50 |
| 4-2 | 176.6 | 178.1 | 52.3 | 98.2 | 672.0 | 6 | 2.50 |
| 4-3 | 177.6 | 179.1 | 50.7 | 84.9 | 719.5 | 9.8 | 2.58 |
| 4-4 | 176.4 | 178.1 | 51.8 | 105.7 | 672.6 | 7.3 | 2.50 |
| 4-5 | 176.8 | 179.7 | 45.9 | 133.0 | 583.7 | 8.5 | 2.58 |

$^{a)}$in equilibrium after 10 min.;
$^{b)}$190° C./21.6 kg;
$^{c)}$average grade to ISO 18553

The invention claimed is:

1. A composite material pellet, comprising:
   (A) a particle having a core-shell structure and comprising:
      (i) a core comprising one or more magnetic materials and
      (ii) a shell comprising silicon dioxide; and
   (B) a polyethylene crosslinkable in the presence of a heat-activatable free-radical initiator,
   wherein the polyethylene is high-density polyethylene (HDPE).

2. The pellet of claim 1, wherein a proportion of polyethylene (B) is from 30 to 99.9% by weight.

3. The pellet of claim 1, wherein a proportion of all particles (A) is from 0.1 to 70% by weight of the pellet.

4. The pellet of claim 1, wherein the core comprises an iron oxide.

5. The pellet of claim 1, wherein the core is from 50 to 90% by weight of the particle (A), and the shell is from 10 to 50% by weight of the particle (A).

6. The pellet of claim 1, wherein the particle (A) is surface-modified.

7. A process for crosslinking polyethylene, comprising:
   mixing the pellet of claim 1, a heat-activatable free-radical initiator, and, optionally, a further polyethylene, to obtain a mixture; and
   crosslinking the mixture, inductively.

8. The process of claim 7, wherein the heat-activatable free-radical initiator is at least one initiator selected from the group consisting of an organic peroxide and an initiator comprising a labile carbon-carbon bond.

9. The process of claim 7, wherein the mixing further comprises mixing into the mixture a substance that increases a degree of crosslinking.

10. A method for producing a pipe, comprising crosslinking polyethylene in the presence of the pellet of claim 1.

11. The pellet of claim 1, wherein the core consists of an iron oxide.

12. The pellet of claim 2, wherein the proportion of polyethylene is from 75 to 99% by weight.

13. The pellet of claim 3, wherein the proportion of all particles (A) is from 1 to 25% by weight.

14. The pellet of claim 1, wherein a contaminant content of the shell is less than 0.01% by weight.

15. The pellet of claim 1, wherein the shell is from 2 to 500 nm thick.

16. The pellet of claim 1, wherein the core comprises Fe, Co, Ni, $Fe_3O_4$, gamma-$Fe_2O_3$, $MgFe_2O_4$, $MnFe_2O_4$, $CoFe_2O_4$, $CoPt_3$, FePt, or a combination thereof.

17. The pellet of claim 1, wherein a BET surface area of a plurality of the particles (A) is from 5 to 500 m²/g.

18. The pellet of claim 1, wherein an average diameter of a plurality of the particles (A) is from 5 to 100 nm.

19. The pellet of claim 1, wherein the core (i) and the shell (ii) are in direct contact.

* * * * *